May 8, 1962 R. H. CARSON 3,033,434
PRESSED ARTICLE WITH SMOOTH TAKE-UP CURVED ZONES
Filed March 27, 1961 6 Sheets-Sheet 1
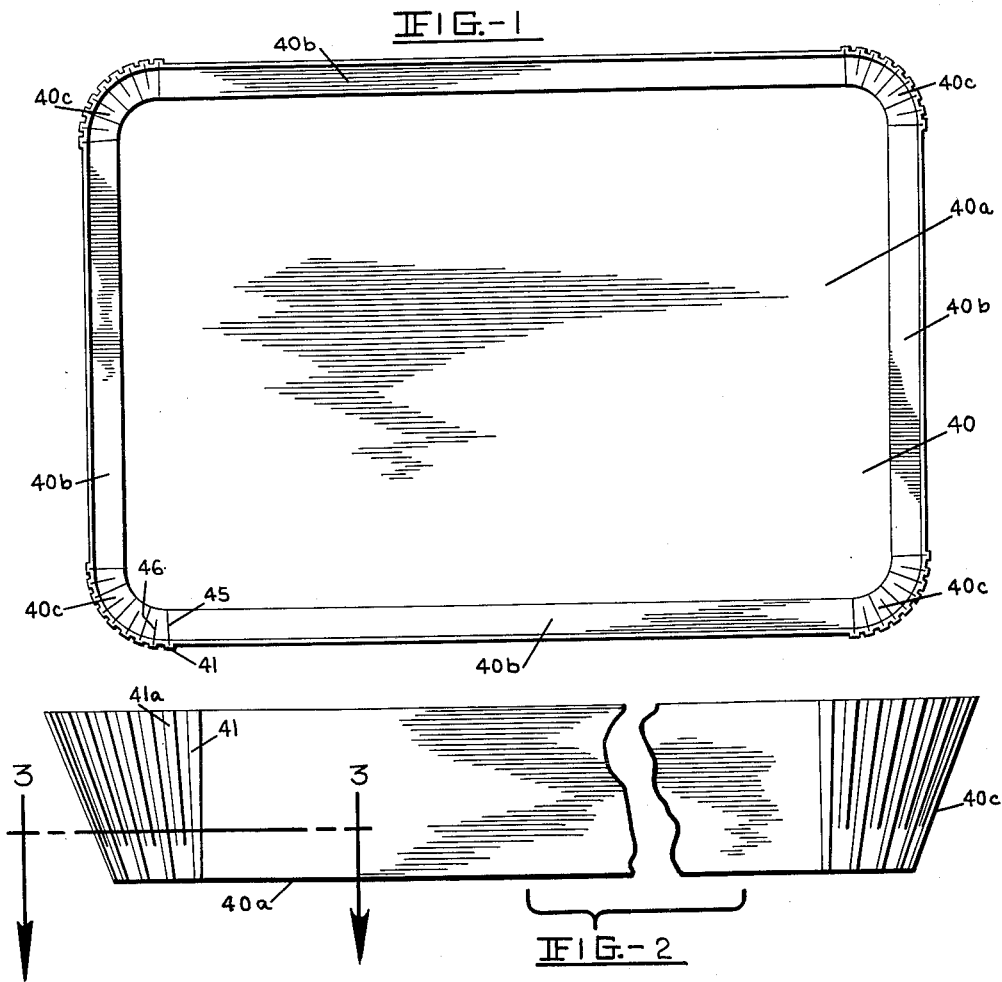
FIG.-1
FIG.-2
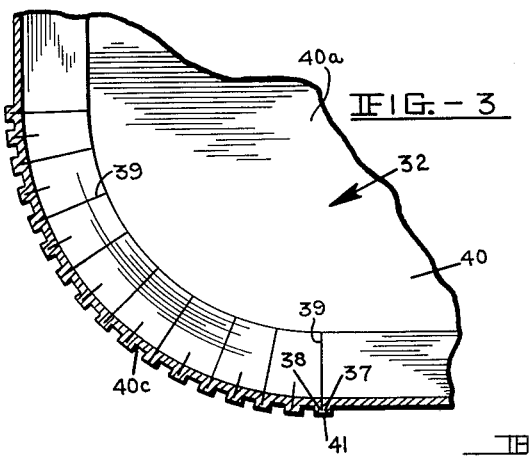
FIG.-3
INVENTOR
ROBERT H. CARSON
BY Herbert A. Weintraub
ATTORNEY May 8, 1962 R. H. CARSON 3,033,434
PRESSED ARTICLE WITH SMOOTH TAKE-UP CURVED ZONES
Filed March 27, 1961 6 Sheets-Sheet 2
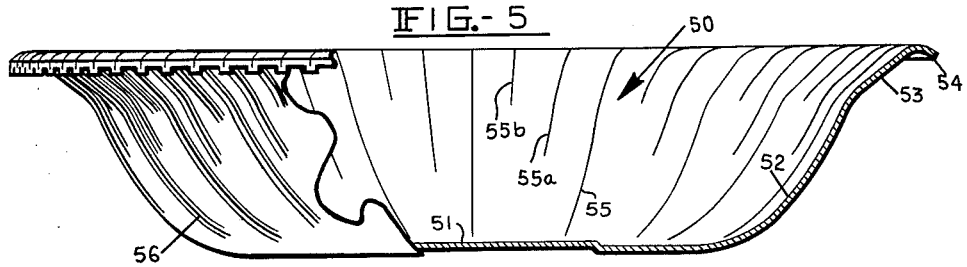
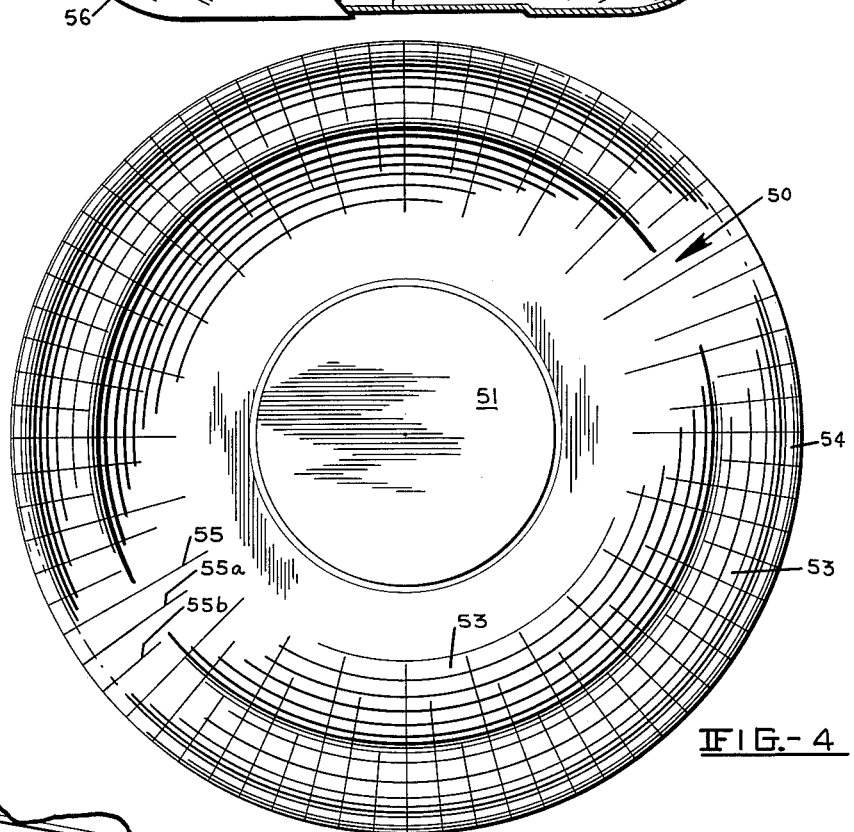
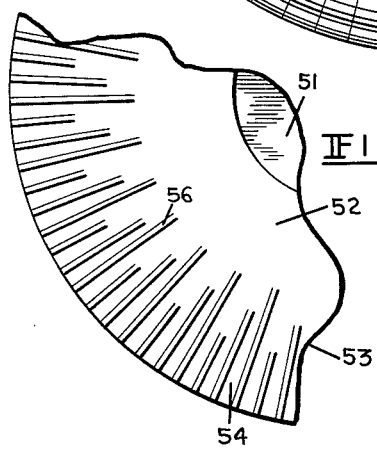
INVENTOR
ROBERT H. CARSON
BY *Herbert Q. McIntyre*
ATTORNEY May 8, 1962 R. H. CARSON 3,033,434
PRESSED ARTICLE WITH SMOOTH TAKE-UP CURVED ZONES
Filed March 27, 1961 6 Sheets-Sheet 3
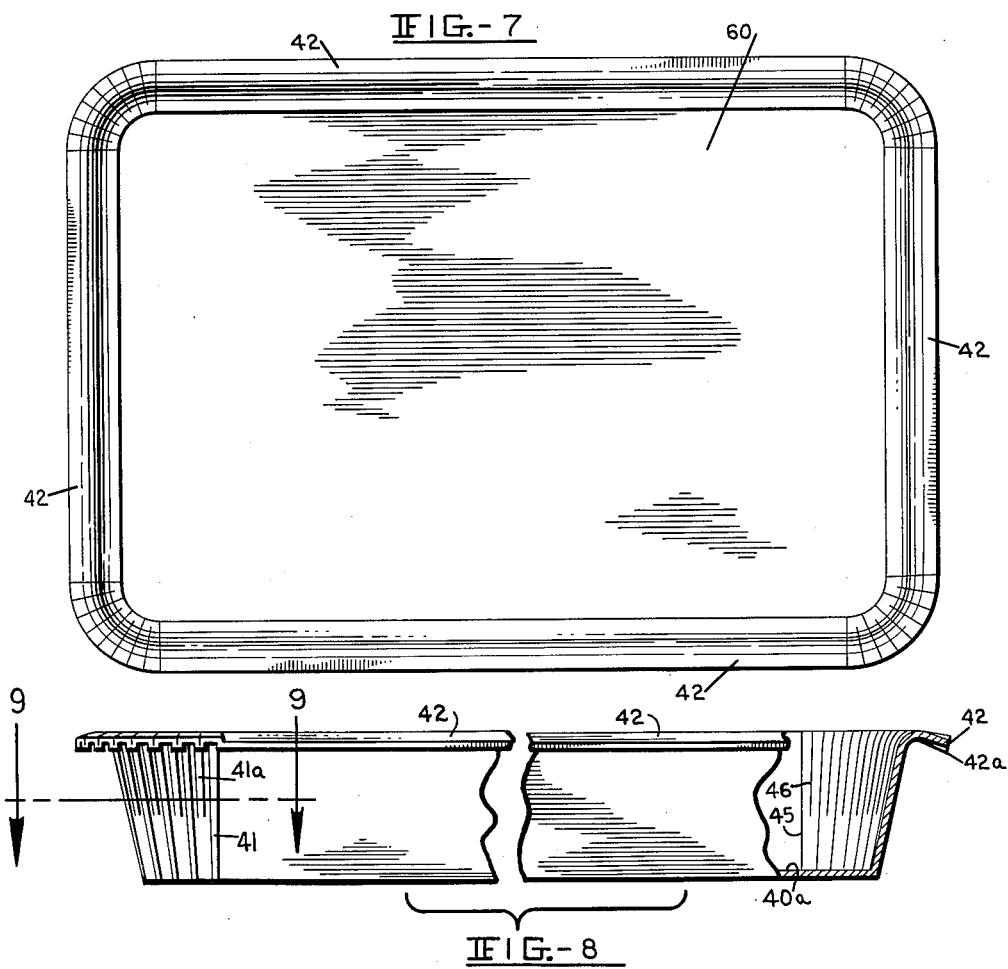
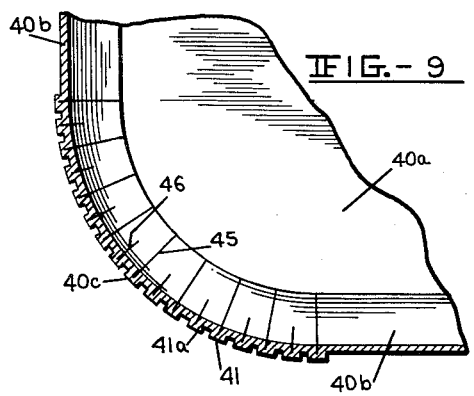
INVENTOR
ROBERT H. CARSON
BY Herbert Q. Winters
ATTORNEY May 8, 1962 R. H. CARSON 3,033,434
PRESSED ARTICLE WITH SMOOTH TAKE-UP CURVED ZONES
Filed March 27, 1961 6 Sheets-Sheet 4
FIG.-10
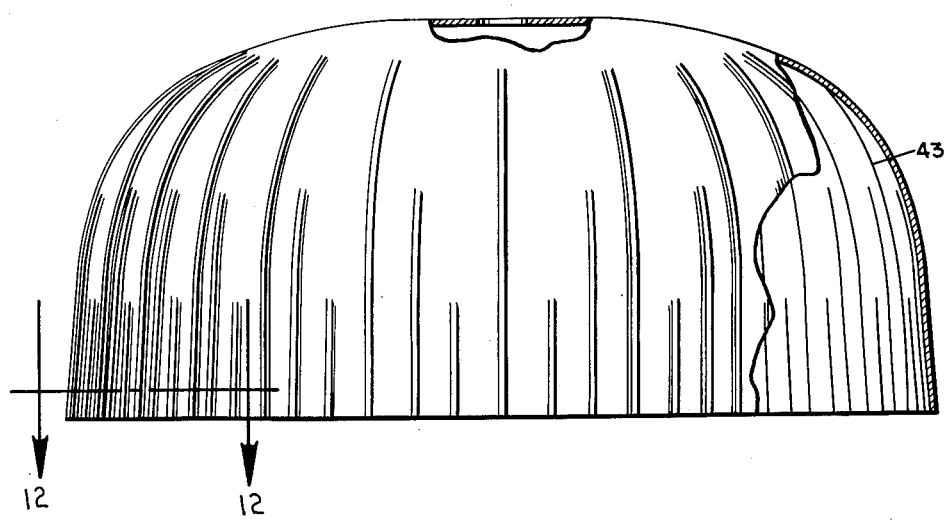
FIG.-12
FIG.-11
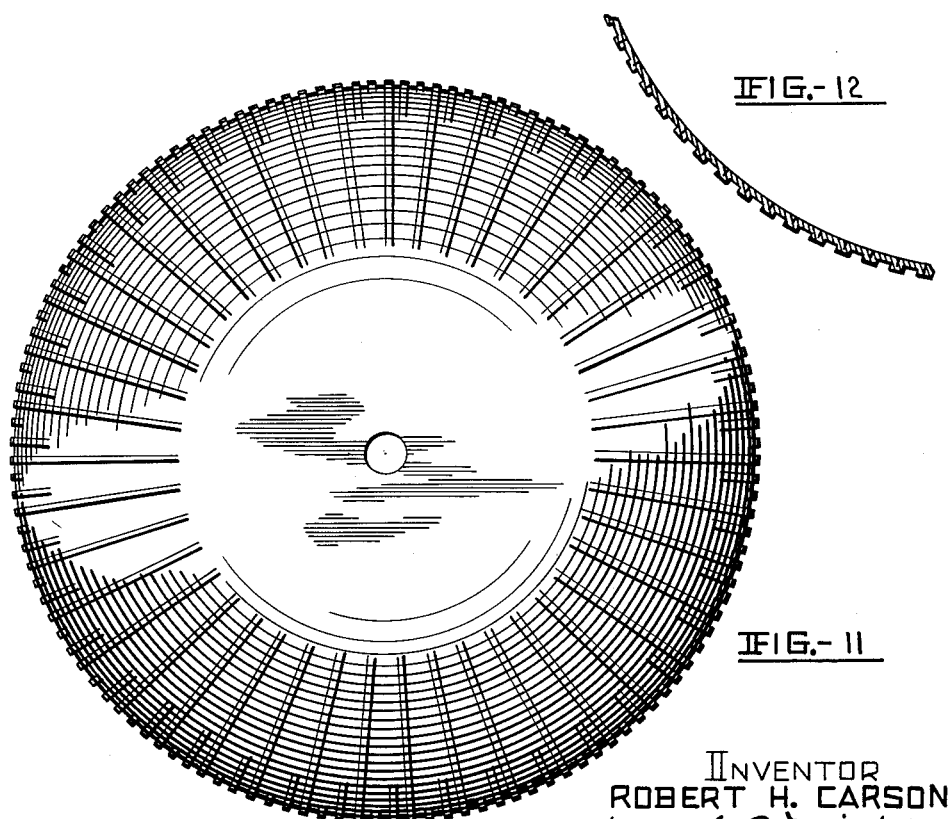
INVENTOR
ROBERT H. CARSON
BY Herbert A. Winters
ATTORNEY May 8, 1962 R. H. CARSON 3,033,434
PRESSED ARTICLE WITH SMOOTH TAKE-UP CURVED ZONES
Filed March 27, 1961 6 Sheets-Sheet 5
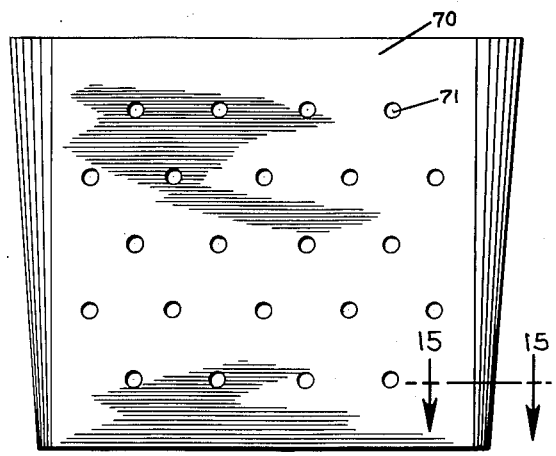
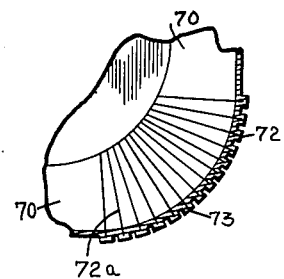
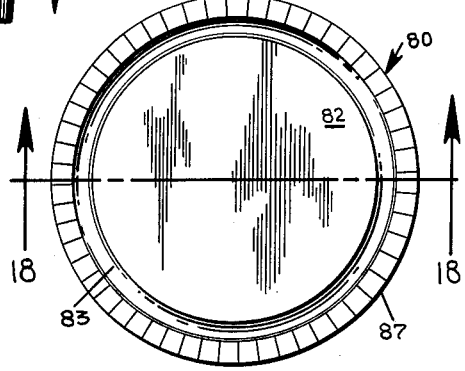
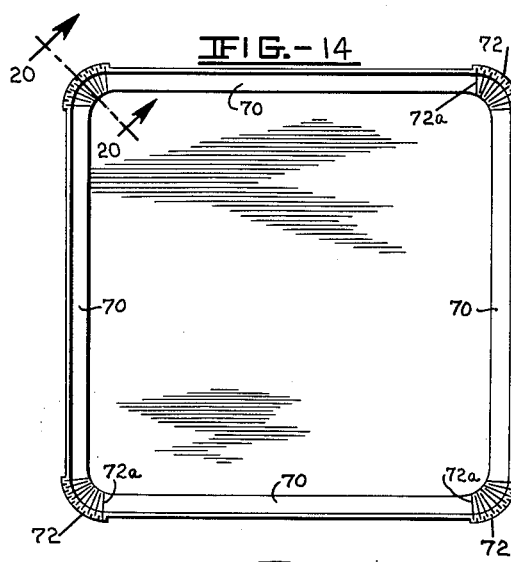
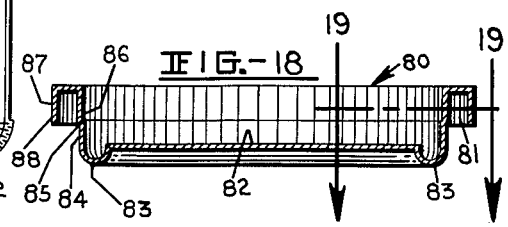
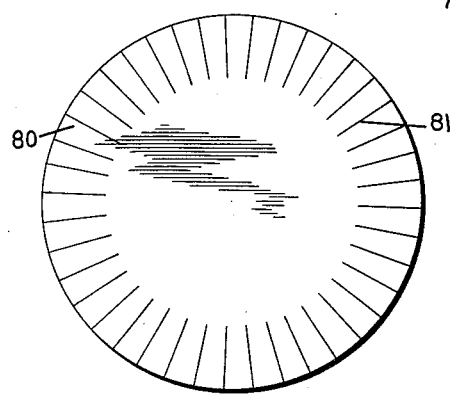
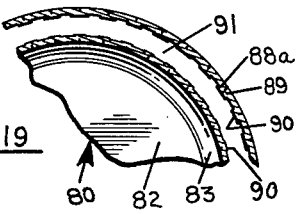
INVENTOR
ROBERT H. CARSON
BY Herbert Q. Vintern
ATTORNEY May 8, 1962 R. H. CARSON 3,033,434
PRESSED ARTICLE WITH SMOOTH TAKE-UP CURVED ZONES
Filed March 27, 1961 6 Sheets-Sheet 6

INVENTOR
ROBERT H. CARSON
BY Herbert A. Newton
ATTORNEY

United States Patent Office 3,033,434
Patented May 8, 1962

3,033,434
PRESSED ARTICLE WITH SMOOTH
TAKE-UP CURVED ZONES
Robert H. Carson, Marion, Ind., assignor to Peerless Machine & Tool Co., Inc., Marion, Ind., a corporation of Indiana
Filed Mar. 27, 1961, Ser. No. 98,500
3 Claims. (Cl. 229—2.5)

The invention described herein relates to a pressed article having curved zones in its walls and junctions of walls with a floor wherein there are no overlapping folds in any of the walls or flanges or lips of the article. The article is made of a material lending itself readily to pressing between male and female dies, and will hereinafter be termed "paper" although this term is to include sheet aluminum.

This application is a continuation-in-part of the copending application Serial No. 791,920 entitled Formed Paper Dish and Method for Making Same, filed February 9, 1959, and issued August 29, 1961, Patent No. 2,997,927.

In the term "article" there is included many forms such as pie plates, compartment plates, trays, bowls, covers, berry boxes, and, in fact, any receptacle or cover which may be formed by pressing the material, including cup lids, and the like. These articles may be deeply formed or in shallow formations such as in trays used for packaging sliced meat.

A primary feature of the invention resides in the fact that in all of the curved zones in the various articles, wherein the material must be taken up, there are no overlapping folds, but to the contrary there is a smooth face presented on the concave sides of those curved zones, with closely abutting, side-by-side rectangular folds on the convex sides, these folds never extending to that dimension which will give an overlapping arrangement. Thus, the excess paper which will be present around a curved zone, is taken up in a very smooth and uniform manner giving in effect a decorative appearance rather than the overlaps heretofore arising.

By reason of the presence of these rectangular side-by-side rectangular folds, the article will be highly resistant to deformation from its final formed shape, even in the presence of heated contents or some substance which is in contact with the article particularly in a heated condition.

These and many other objects and advantages of the invention will become apparent to those versed in the art in the following description, reference being made to the accompanying drawings, in which FIG. 1 is a view in top plan of a rather shallow tray embodying the invention, the tray being more or less rectangular;

FIG. 2 is a view in side elevation on an enlarged scale;

FIG. 3 is a detail in section on the line 3—3 in FIG. 2;

FIG. 4 is a view in top plan of a bowl;

FIG. 5 is a view in side elevation of the bowl and in partial section;

FIG. 6 is a detail in bottom plan of a marginal portion of the bowl;

FIG. 7 is a view in top plan of a tray somewhat similar to that shown in FIG. 1, but having an outturned flange around its upper marginal portion;

FIG. 8 is a view in side elevation of the tray shown in FIG. 7 on an enlarged scale, and in partial section;

FIG. 9 is a detail in section on the line 9—9 in FIG. 8;

FIG. 10 is a view in side elevation and partial section of a dish cover;

FIG. 11 is a view in bottom plan of the cover;

FIG. 12 is a detail in section on the line 12—12 in FIG. 10;

FIG. 13 is a view in side elevation of a box suitable for holding berries or fruit;

FIG. 14 is a view in top plan of the box;

FIG. 15 is a detail on an enlarged scale and in section on the line 15—15 in FIG. 13;

FIG. 16 is a blank in the flat state employed for making a glass or cap cover;

FIG. 17 is a view in top plan of the finished cover;

FIG. 18 is a view in diametrical section on the line 18—18 in FIG. 17;

FIG. 19 is a detail in section on the line 19—19 in FIG. 19;

Figure 23:
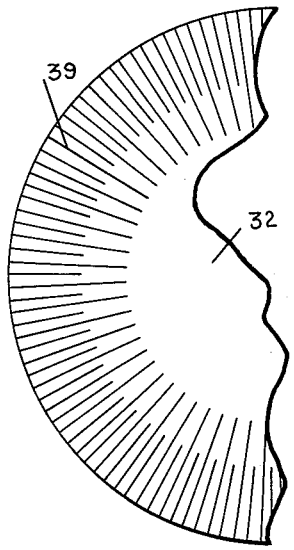
FIG. 23 is a fractional plan view of a blank indicating a plan of scoring.
Figure 24:
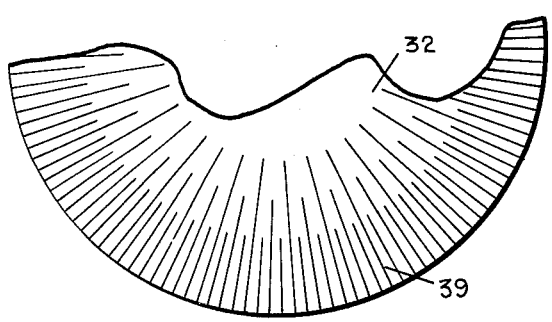
FIG. 24 is a fractional plan view of a blank indicating a modified plan of scoring.

The article forming the subject matter of the present invention may be better understood by considering the method of its production, such as is outlined in the application Serial No. 791,920, from which, as above indicated, the present application is a division. This method of forming the article may be summed up briefly as follows:

Blanks are formed either in rectangular or circular shapes, and the zones of these blanks which are to be curved are impressed on radial lines to cause what might be termed a scoring penetrating the blank material, the cross section of a score being arcuate on that side of the blank which will have a concave surface when the curvature is produced. The pattern of scoring will vary depending upon the depth of the article to be produced, and in order to prevent too wide a spacing between the outer ends of the scoring at the periphery of the blank, intermediate short line scores may be made such as are indicated in FIGS. 23 and 24. These patterns are not set out as limitations, but may vary depending upon the material employed, its thickness, and the nature of the material as to tendency to take-up around the curved surfaces.

The scored blank is fed between a male and female die arrangement, and an important feature of these two parts of the die is that the surfaces of both die portions which will form the curved zone are perfectly smooth and entirely devoid of any ribs, corrugations, or deviations from a smooth surface. This is indicated in FIGS. 20–22.

Figure 20:
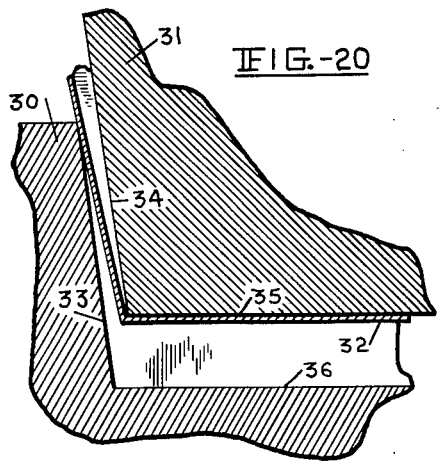
FIG. 20 is a diagrammatic view in vertical section through a port in a male and female die carrying a blank therebetween partially formed comparable to a section on the line 20—20 in FIG. 14.
Figure 21:
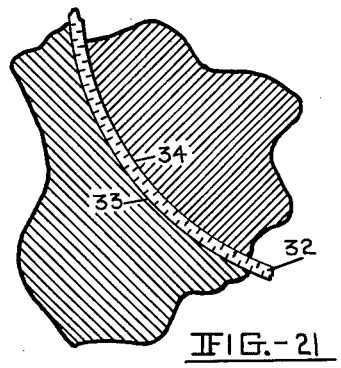
FIG. 21 is a view in horizontal section through a male and female die portion in each instance with a length of the paper blank therebetween.
Figure 22:
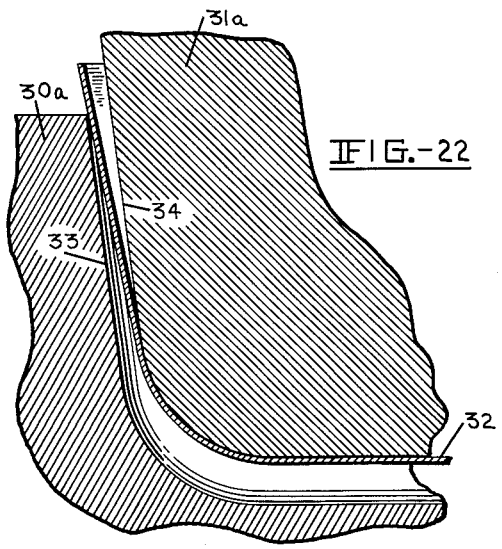
FIG. 22 is a view in vertical elevation of portions of the male and female die with a partial rounded bottom merging from a sloped wall or a paper blank therebetween.

The scored blank is fed in between the male die 30 and female die 31, FIG. 20, for the rectangular plate with corner curves in the upstanding walls, FIG. 14, and between the male die 30a and female die 31a, FIG. 22, where a bowl type article is being formed. Regardless of the extent of the curvature produced in the article, it is always the scored side of the die which is uppermost to be in contact with the female die as the blank generally indicated by the numeral 32 is carried downwardly into the male die 30 by the female die 31.

It is to be noted, FIG. 20, that the horizontal spacing between the curved surface of the male die 30 and the mating surface of the female die 31, these surfaces being designated by the numerals 33 and 34 are spaced a greater distance than the thickness of the blank 32. This means that there is no compressing action laterally of the blank 32 between those surfaces 33 and 34 while the female die 31 is traveling toward the male die 30, and at least not until the underside 35 of the female die approaches the floor 36 of the die 30, and even then, this distance between the walls 33 and 34 is substantially equal to the thickness of the blank 32 when the central portion of the blank is firmly seated against the floor 36. It is in the stage of the entering of the female die 31 within the die 30 and this downward travel of the die 31 that the peculiar formation of the curved portion of the article is produced.

Within the space between the walls 33 and 34, the material of the blank 32 will align itself on each of the score lines in a very regular arrangement around the curved portion in the manner as indicated in FIG. 3. In this arrangement, the material of the blank 32 will fold on the line to cause shoulders 37 and 38, FIG. 3, to come together over the line in each instance, this line being designated by the numeral 39 in the one instance, so that there is a sealing effect between the shoulders 37 and 38 which gives a smooth surface around the curved portion of the article, this article in the present instance being given the number 40 and constitutes a shallow rectangular tray with the curved portions in each corner. On the outer side of the blank, the material will fold around in more or less rectangular manner extending outwardly from the outer surface of the blank 32 approximately a distance equal to the thickness of the material, this distance however varying slightly depending upon the material whether it be metal or paper or plastic. The important thing is that this process produces no overlaps, that is a distinct folding inwardly or outwardly of the paper into a loop which is carried around and back against the outside or inside of the wall. That is to say, that the paper comes together at the shoulders 37 and 38 along a straight line in a plane which includes the original score line then at the bottom of the folded over portion 41. The portions 41 do not travel around the convex side of the zone of curvature, but remain spaced apart as distinct, outwardly extending folds.

The spacing between the die sides 33 and 34 is such that as the two dies approach their final limit of travel with the blank 32 then finally serving as a spacing apart of the floors of the two die portions, the fold 41 will not be distorted but only slightly compressed so that they will retain their shape, and in the rectangular formation tend to reinforce the curved zone without tendency for that zone to open up along the lines 39.

Normally, the material of the blank especially when it is a paper of fibrous constituency is initially coated with a waterproofing material, and this material aids in sealing along the abutments of the shoulders 37 and 38.

The same method is employed in making the deeper article such as the berry box of FIGS. 13–15. By reason of the fact that the dies have clearance between their opposing side walls until the final stoppage of one die against the other across the floors thereof provides the spacing between the side walls of the dies so that there is no appreciable drawing effect tending to stretch the paper. The primary operation is to provide for taking up of the paper around the curves extending from a floor portion.

The same procedure is followed in making deep drawn bowls such is shown in FIGS. 4–5 and also in making trays wherein there is an overturned flange 42, FIGS. 7 and 8.

Referring to the bowls of FIGS. 5–6 and also to the inverted bowl 43 of FIGS. 10–12 which in the present showing is to be employed as a cover over foods carried on a plate such as is commonly done in serving foods in a restaurant or the like, blanks will be so formed that the score lines will extend entirely around in part at least through the area to be curved, and the very same thing is had in that the inner sides, that is the concave sides of the curvature, become perfectly smooth and only the line of abutment of the shoulders of the score meet on those lines, in a sealing manner whereas the rectangular fold appears on the outer, convex side in the nature of a rectangular rib therearound through the major part of the curvature, or at least that part of the curvature where there is appreciable take-up of the paper required in producing and retaining the curvature. As indicated above, this word "paper" is intended to be sufficiently broad to include either the actual fiber paper or aluminum, and foldable plastics.

So much for the method of forming the article which constitutes the invention herein.

The depth of the folds at each score line is determined entirely by the spacing apart of the lines circumferentially around the curved zone, and also by their radial lengths. As the degree of curvature decreases, the folds will merge at the ends of these lines into the flattened area, still without overlapping. These rectangular folds may be termed pleats as distinguished from an overlapping fold which has heretofore always occurred in the absence of flutes and ribs in the dies or in other processes invariably leading to the overlapped portions in the travel of the paper in the "take-up" around the curvature.

Now referring to the specific articles, a rectangular, shallow tray generally designated by the numeral 40 has a flat floor 40a with an outwardly and upwardly flaring wall 40b entirely therearound. Each of the corners generally designated by the numeral 40c is curved without overlaps or the necessity of the use of adhesive or clips or staples. Each of these corners 40c has a smooth surface entirely therearound merging into the end and side walls of the overall wall 40b, marked off in visible radial lines 45 and 46, these being the lines there visible over and above the score lines as above described in reference to FIGURES 23 and 24. There is no gap across these lines 45 and 46, whether short or long, and whether or not they go entirely to the floor 40a. Outside of the corner 40c there is a rectangular rib 41, normally spaced one from the other, particularly at their outer, upper ends, these ribs 41 being aligned on the inner lines 45 and 46. As indicated in FIG. 2, the ribs 41 follows the inner score line 39 entirely from the top to the bottom of the wall 40b, whereas the ribs 41a, is a shorter one than the rib 41, and its lower end terminates above the floor 40a. These ribs 41 and 41a are possessed of a permanent shape, and the whole corner 40c is stable and does not have a tendency to spread apart, particularly in view of the fact that the depths of the folds 41 from the inner concave side of the corner 40c are slight and the material of the tray takes on a permanent set.

The article shown in FIGS. 4–6, constitutes a shallow bowl, deeper however than is the tray 40. In the form herein shown, the bowl generally designated by the numeral 50 has a circular form wherein there is a central floor area 51 from which the bowl extends around and upwardly and providing an inner concave curvature 52, flaring outwardly toward the top by an outwardly inclined circumferential area 53 and thence terminates in a slightly turned down flange 54. In this article, there are the internal radial lines 55, 55a, and 55b, decreasing in length, with the continuing pattern thereof entirely around the bowl. These lines extend from near the floor 51 which in the present instance is flat, and outwardly entirely to the outer peripheral edge of the flange 54. These lines do not indicate openings, but to the contrary indicate lines of abutment of the paper on each side thereof as it takes up in forming the somewhat spherical surface, the shorter lines extending primarily through the outwardly inclined portion 53. On the outside of the bowl, there is aligned on each of these internal lines 55, 55a, and 55b a rectangular fold 56 in each instance extending radially from the center of the bowl and downwardly from the outer edge of the flange 54 to the ends of the lines mentioned appearing on the inside or concave side of the bowl.

In each instance, these folds or pleats 56 remain spaced apart, and in rectangular cross section, being compacted into what may be termed a permanent set, so that the bowl is a rigid article and not tending to open up along the lines 55, 55a, and 55b. These bowls being intended for many uses, including the serving of foods, are coated in the blank state with some water repellent material, and this material aids in sealing along the lines 55, 55a, and 55b. These rectangular ribs serve as reinforcements to the various areas in the bowl, and particularly to the areas 53 and 54.

The tray shown in FIGS. 7-9 is similar in all respects to the tray shown in FIGS. 1-3, with the exception that in this tray designated by the numeral 60, there is an outturned flange 42, turning downwardly slightly from the horizontal by its outer peripheral edge 42a. Here the rectangular ribs are carried outwardly under the flange to edge 42a, and the lines 45 and 46 are carried also to this peripheral edge 42a. The ribs 41 and 41a are not only structurally functional, but also add considerably to the appearance of the wall from the outside of the trays and of the the articles in general. The presence of the ribs 41, 41a under the flange 42 also aids in retaining a grip on the tray 60 as it may be picked up and moved around. These particular trays 40 and 60 are generally used in the packaging of cuts of meat, such as steaks, and then the entire tray containing the meat is wrapped in some transparent plastic to form a package used to a large extent in the self-serve markets. The trays do not become soggy by drawing juices out of the meats, particularly in view of the fact that the material if it is not metal or plastic is coated before being formed to resist moisture absorption.

Berry boxes shown in FIGS. 13-15 are readily produced by the method above indicated, and constitutes a distinct advance over the heretofore employed stapled cornered boxes either of wood or fiberboard. While these boxes may range to considerable depths, such as some three and one-half to four inches deep, with a top four and one-half inches in each direction of the top edges of the side walls, to a three and one-half inches square bottom. Of course the boxes may be made other than square, but the square form generally is acceptable and lends itself to storage without loss of space. In this form, the walls generally designated by the numeral 70 are preferably perforated in the blank stage to a plurality of holes 71 therethrough for ventilation purposes. Here in the corners 72, the lines appearing on the inside of the concave zone around those corners will extend almost from top to bottom of the wall, with intervening shorter lines. The same structure is found here in these corners 72 in that the lines 72a are in the surface of the inside of the wall, to give a smooth contour therearound so that the contents, including berries in a ripened stage are not indented or allowed to squeeze through openings or sharp corners as has heretofore been the case in other types of containers. There are no overlapping folds either inside or outside, and the corners are distinguished by their externally appearing rectangular ribs 73 aligned along the internal appearing lines 72a, FIG. 15. As has been indicated above, there are no openings into the insides of these folds 73, particularly in view of the fact that in the forming thereof, these folds form freely, and are not aligned along any ribs or flutes in the dies. These folds 73 as before constitute the "take-ups" of the material around the curved zone.

One other example of the variously formed articles that are possible to be brought within the overall construction, constitutes a cover primarily employed for covering smooth mouthed drinking glasses, jelly glasses, or even paper cups and the like. In this form, a circular blank 80, FIG. 16, is formed exactly in the same manner as are the blanks for the other articles herein described, having the radial score lines 81, here shown of even lengths, but constituting variable lengths of lines depending upon the depth of the cover to be produced and the diameter of the cover. This blank is formed between male and female dies into the shape as indicated in FIGS. 17-19.

This cover 80 has a generally flat area 82 circular in shape, and from the periphery of which area 82, the cover is carried into a circular or annular relatively deep groove 83. The internal ends of the lines 81 extend downwardly into this groove 83, and therefrom vertically into the annular side wall 84 which is turned upwardly in a cylindrical manner, to a shoulder 85 wherein there is an offset producing a cylindrical portion 86 of slightly larger diameter than that of the cylindrical portion 84. From the cylindrical portion 86 the material is carried somewhat sharply radially outwardly a distance and then turned downwardly into a cylindrical sleeve 87 terminating by an edge 88 spaced from the shoulder 85. The lines 81 continue across the cylindrical portions 84, shoulder 85, cylindrical portion 86, and around into the sleeve 87. In the formation of these various portions of the cover, the lines 81 are submerged within the material to allow shoulders 88 and 89 to abut one another over those score lines, to have the rectangular fold 90 on the opposite side thereof.

In the formation of the cylindrical portion 86 and the sleeve 87, the rectangular folds will be on the opposing faces as indicated in FIG. 19 particularly, these folds serving as the gripping zones against the rim of the container which will be received within the annular space designated by the numeral 91. These covers 80 are generally paraffined or waxed, so that in sliding the cover into position on the container, the rectangular folds serve as a gripping zone with the wax sealing the cover to the container. The lines between shoulders 88 and 89 will appear on the outside of the cylindrical sleeve 87, and on the inside of the cylindrical portion 86 so that there are the ribs or ridges 90 opposing one another across the space 91. As before, these folds 90 are closed without any space being left therein, and resist any tendency for outward bending of the sleeve 87 away from the outside of the container.

By reason of the presence of the shoulder 85, the cover 80 may be readily inserted by a cylindrical portion 84 within the container mouth, this portion serving as a guide, and then the cover 80 may be pressed on downwardly into a sealing fit by causing the cylindrical portion 86 to be carried downwardly within the mouth, affording a tight seal by reason of the compression required in a tendency to reduce its overall diameter.

As above indicated, any and all of these forms may be made out of the fiber cardboard, metal foil such as aluminum particularly, and in the foldable proper gauge types of plastics. In the fiberboard materials, that material is generally moistened, and then after being formed in the dies, and before being released therefrom, is heated to dryness to give a final set to the form. This would not be necessary of course in using the light gauge metals, but may be used to advantage in some of the plastics suitable for this mode of formation, that is the finished product may be heated to give it a final set before it is kicked from the dies, the moisture not of course having been introduced beforehand.

While I have herein shown and described a number of different forms of articles all embodying the same structural formation of curved zone areas, all in the absence of the take-ups of the material going into overlapping folds, but forming ribs or ridges externally or on the convex side of the curved zones, and entirely closed with a smooth contour or surface on the concave side. Therefore, while I have described these several forms, it is obvious that other forms may be employed to include these structural parts without departing from the spirit of the invention, and I therefore do not desire to be limited to the precise forms as have been described, beyond the limitations which may be imposed by the following claims.

I claim:
1. In a dish, a wall comprising an area of a flexible, pressure-shaped material, in which area
   the wall tapers in dimension around said area from an upper wide zone to a lower narrow zone;
   the wall area is arcuate in surface transversely of said dimension;
   there are regularly spaced, radial score lines on the inside of said tapered area, one line sloping toward another and toward said narrow zone;
   and a rib on the outside of the wall over each of said lines, and within which ribs said lines are embedded.

2. The structure of claim 1 in which said lines are in groups of a long line with an intervening short line; and said ribs are likewise long and short.

3. The structure of claim 1 in which said wall area surface is arcuate both circumferentially and radially.

References Cited in the file of this patent
UNITED STATES PATENTS

| | | |
|---|---|---|
| 2,053,299 | Reed | Sept. 8, 1936 |
| 2,375,993 | Hulbert | May 15, 1945 |